Patented Nov. 28, 1922.

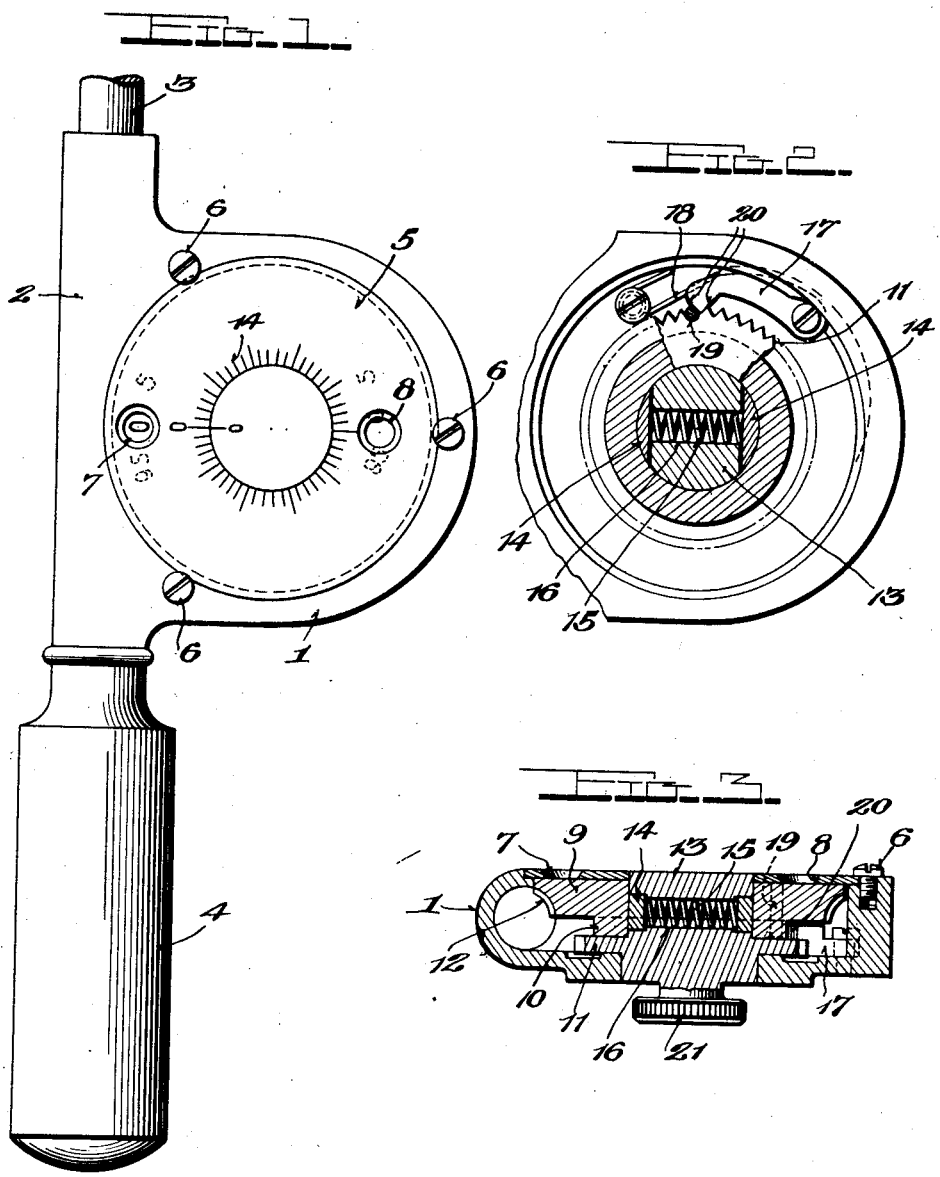

1,437,353

UNITED STATES PATENT OFFICE.

JOHN W. PARKER, OF BARRINGTON, RHODE ISLAND, ASSIGNOR TO BROWN & SHARPE MFG. CO., OF PROVIDENCE, RHODE ISLAND.

REVOLUTION COUNTER.

Application filed January 21, 1922. Serial No. 530,875.

*To all whom it may concern:*

Be it known that I, JOHN W. PARKER, a citizen of the United States, residing at Barrington, in the county of Bristol and State of Rhode Island, have invented new and useful Improvements in a Revolution Counter, of which the following is a specification.

This invention relates to certain new and useful improvements in a revolution counter for determining the speed of machine shafts and similar rotating bodies, the primary object being to provide a novel and accurate mechanism for counting the revolutions both in clockwise and counter-clockwise directions.

The invention further resides in the provision of a novel motion transmitting means between the "units" dial and the dial for indicating multiples of the maximum count of the "units" dial.

Further the invention resides in the novel features of construction and the arrangements and combinations of parts hereinafter described, reference being made to the accompanying drawings, wherein:

Figure 1, is an elevation of the improved revolution counter, a portion of the spindle point being broken away;

Figure 2, is an irregular cross section through the counter mechanism on a radial plane; and Figure 3, is a transverse diametrical section through Figure 1.

Referring more in detail to the accompanying drawing, numeral 1 designates the casing for the counting mechanism, which casing is provided with a tangential bearing 2 to provide journal support for the spindle 3, one end of which is formed to have rolling contact against a rotating shaft while the opposite end is designed to support a handle 4 in a swivel manner.

A removable face plate 5 of annular shape is secured to the casing 1 by suitable fasteners 6 and is provided with sight openings 7 and 8 arranged different distances from the axis so that two concentric circles of numerals on an underlying "units" dial may be viewed simultaneously. The "units" dial 9 is in the form of a worm gear having a hub extension 10 bearing on a ratchet wheel 11 so as to support the dial face in proximity to the sight openings 7 and 8. In the particular disclosure the numerals in one circle progressively increase clockwise while the inner circle progressively increase counter-clockwise thereby adapting the dial for registering revolutions in both directions of rotation. The teeth 12 of the worm gear 9 are designed to mesh with a worm (not shown) on the spindle 3 so that as the spindle is rotated through frictional contact with a rotating body, the worm gear will slowly be revolved. The dial numerals are depicted as representing one hundred revolutions during one complete revolution of the worm gear and each complete revolution of the worm gear is registered by a "hundreds" dial 13 which has a zero point on its outer face coacting with dial graduations 14 on the face plate 5. The indicator or dial 13 is of cylindrical form and is journaled at its opposite ends in registering openings formed in the casing and face plate. The ratchet 11 is fixed on the barrel while the worm gear is journaled thereon and frictionally connected thereto by a pair of oppositely arranged shoes or bearing members 14, said shoes being guided in peripheral recesses and resiliently urged outwardly against the inner wall of hub 10 by a coil spring 15 arranged within a diametrical bore 16 in the cylinder 13, as is clearly depicted in Figures 2 and 3. Obviously, rotation of worm gear 9 will impart a like movement to the cylinder 13 and in order to hold the cylinder for intermittent action a pawl 17 is pivoted to the casing and has its free ends urged by a spring 18 into engagement with the teeth of ratchet 11. A release pin 19 extends in an axial direction from the inner side face of the worm gear and into the path of the free end of pawl 17 which free end has bevel faces 20 which ride outwardly on the pin 19 and thereby lift the pawl out of engagement with the ratchet. This action occurs for every complete revolution of the worm gear 9 and immediately following the movement of the pin 19 beneath the free end of pawl 17 the latter will drop, aided by spring 18, into the next succeeding ratchet notch to hold the dial 13 stationary until another revolution of the worm gear, the friction shoes slipping to provide for the relative movement between the two dial members when the dial 13 is arrested by the pawl. As soon as the pawl is disengaged the friction shoes function to connect both dial members so that they will move as a unitary structure for a distance equal to that between adjacent ratchet teeth.

In either direction of rotation every complete revolution of worm gear 9 will be registered by the central dial member 13 since the pin 19 will ride on the respective bevel faces 20 of pawl 17 to release the ratchet 11. A hand knob 21 projects from the rear end of the cylinder 13 so that the dials may be reset to zero position when desired, the pawl moving outwardly by reason of the ratchet teeth camming on the beveled nose of said pawl.

Having thus described my invention, what I claim as new and desire to secure by Letters Patent is:—

1. A counter comprising a casing open on one side, a cylindrical member journaled in the opposite side and formed integrally on one end portion with an operating handle and a ratchet, a pawl pivoted on the casing for engaging the ratchet and having a lateral extension, a rotatable member journaled on the cylindrical member and provided with a spacing hub-extension bearing on the ratchet, said rotatable member having gear teeth formed on its inner marginal portion, a tangentially arranged driving spindle having a part with which the gear teeth mesh, a pin carried by the member and extending into the spacing between the latter and the ratchet into the path of the lateral extension of the pawl to render the same inoperative, a frictional connection between the cylindrical member and the rotatable member, and a removable face plate closing the open side of the casing and providing journal support for the adjacent end of said cylindrical member.

2. A counter comprising a casing open on one side, a cover for said open side having a sight opening therein, said cover and casing provided with registering bearings, a cylindrical member journaled in the two bearings and provided with a fixed ratchet and a diametrical chamber adjacent the latter, a gear member journaled on the cylindrical member over the diametrical chamber, a friction clutch concealed within said chamber by said gear member for clutching the latter to the cylindrical member, and means for arresting the ratchet, said means rendered inoperative intermittently by said gear member and the latter having dial markings on its outside face readable through the sight opening of said cover.

In testimony whereof I have signed my name to this specification in the presence of two subscribing witnesses.

JOHN W. PARKER.

Witnesses:
M. A. KINGSLEY,
J. A. MILLER.